July 27, 1943.　　　F. TOOP　　　2,325,347
TWO-UNIT WORK-SHELF SHEARS
Filed July 7, 1938
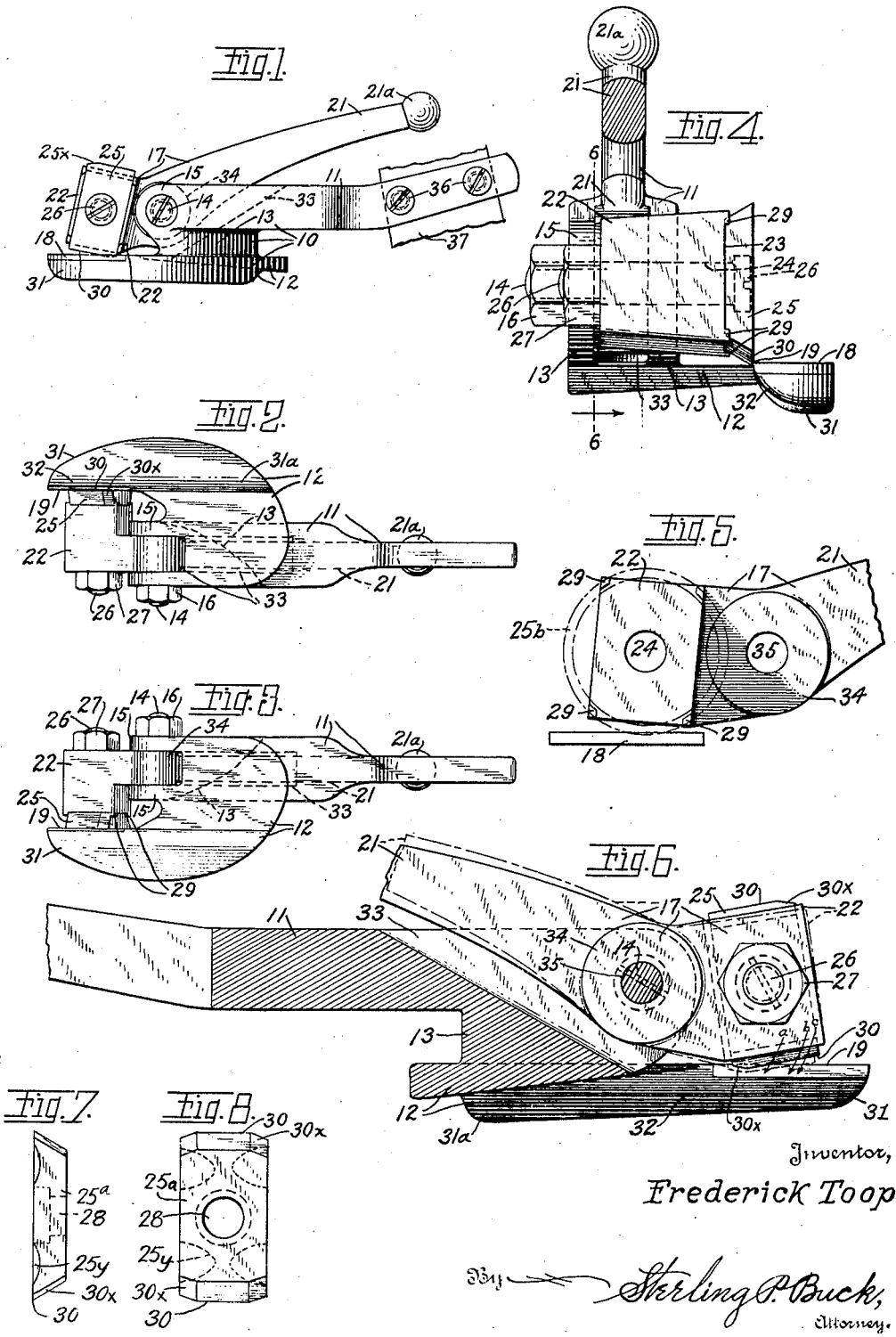
Inventor,
Frederick Toop.
By Sterling P. Buck,
Attorney.

Patented July 27, 1943

2,325,347

UNITED STATES PATENT OFFICE 2,325,347

TWO-UNIT WORK-SHELF SHEARS

Frederick Toop, York, Pa., assignor to Petco, Inc., York, Pa., a corporation of Delaware Application July 7, 1938, Serial No. 217,912

11 Claims. (Cl. 30—257)

This invention relates to hand-tools for shearing sheet metal and the like. By the term "hand-tools" is meant, tools that may or may not be entirely operated by the hand or hands of the users, but that are carried by hand to the work-material and manipulated according to direction or directions of the line along which the shearing is to be accomplished; for instance, as in the case of my pending application No. 216,739, filed June 30, 1938, where the device is attachable to a hand-carried motor by which the shearing tool is carried and operated; but the term "hand-tools" is not to be inferred as a limitation as to the mode of using such devices, for it is quite possible and sometimes practical to fix the motor in position and to manipulate the work-material with respect thereto, and also possible to operate such devices by hand for effecting the shearing of sheets or strips of material.

While the present invention has certain features in common with the hand-shears shown in the above-mentioned application, including a work-shelf, it also has certain distinguishing features, one of such features being the combination of only two levers of distinctive form pivotally connected in such manner that their respective shearing edges are moved in the shearing strokes by separation of the power-applying arms, instead of by pressing such arms towards one another.

Therefore, the present invention is given the short distinguishing title of—Two-unit work-shelf shears.

One object of this invention is to provide an exceedingly simple, compact, rigid, strong, adaptable and thoroughly practical shears of the "chewing" type, viz., the type shown in the above-mentioned application where the shearing strokes are short and in rapid succession, so that the jaws or cutting edges move only a very small fraction of an inch across one another so as to reduce distortion of the sheet material to the minimum or to practical nullity; but, by the rapidly succeeding shearing strokes, and proportionally rapid feeding of the sheet material, or advance of the tool against the material, the resultant shearing or "chewing" operation is of maximum rapidity.

A further object of this invention is to provide ample clearance between the work-shelf and the supporting arm to enable the work-material to be turned about the shearing point and thereby directed along a curved angular, or zigzag line, according to the shape of the thing to be produced from the sheet or strip material being worked upon.

A further object of the invention is to provide an improved form of shearing blade which, while maximizing the shearing operation, aids in minimizing the distortion or bending of the work-material, and which provides clearance that enables the work-material to be turned in opposite directions about the shearing point.

Another object is to provide a novel and very practical shearing-blade-seat on which can be seated, interchangeably, a circular blade for rotation in the shearing operation, and an angular shearing blade in non-rotary but adjustable relation.

Another object is to provide an improved form of work-shelf that is relatively thin and wide or horizontally extensive and is entirely plane on its upper surface and that has a plane portion of its under surface in rear of the shearing edges, the plane under-surface being forwardly and upwardly inclined to a point or edge that is substantially level with the shearing point, while the rear and outer-lateral edges or margin of the work table are amply thick to provide necessary strength and rigidity, the effect of the forward inclination with respect to the shearing point being to provide the vertical thinness that is necessary to eliminate distortion of the residue of the work-material after the respective parts of the material pass rearward from the shearing blades.

Another object is to arrange the shearing edges tangentially to a wide theoretical circle around the pivotal connection of the units that include the respective shearing edges, so that the swing of the operating lever causes an acute angular movement of one of the shearing edges with respect to the other one of the shearing edges, or, in other words, a combined lateral and longitudinal movement, so there is a slicing action and a pulling action that tends to assist the feeding and the smooth-cutting of the material being sheared.

Other objects and important features are pointed out or implied in the following details of description, in connection with the accompanying drawing in which:

Fig. 1 is a left-side elevation of the invention, reduced in size.

Fig. 2 is a bottom-plan view of the invention as disclosed in Fig. 1.

Fig. 3 is a view similar to Fig. 2, but of a modified form that has the work-shelf and shearing edges on the reverse side from those elements of Fig. 2.

Fig. 4 is a full-size front end view, as disclosed in the full-sized working tool from which these drawings are made, a part of the operating arm being broken out to show a part of the supporting arm, and a part of the operation arm being in cross-section.

Fig. 5 is a full-size detail view showing the front arm of the operating lever or upper unit, a part of the rear arm being broken off, the angular shearing blade being omitted, and the position and relation of a circular or rotary blade being indicated by broken lines; the lower shearing blade also being shown in its normal relation to the upper or rotary shearing blade.

Fig. 6 is a full-size sectional view of the main parts of the two pivotally connected units, the attaching ends of the supporting and operating arms being broken off, the section being taken on the line 6—6 of Fig. 4, viewed in the direction of the arrow that crosses line 6—6, the curved arrows being indicative of the direction of shearing movement, the broken lines showing the approximate extent of swing or stroke of the operating arm or upper unit with respect to the lower unit of the shearing tool.

Fig. 7 is a longitudinal edge view of a slightly modified form of upper shearing blade that is attachable to the blade-seat that is most clearly seen in Fig. 5, and also attachable and operable on either of the forms shown in Figs. 2 and 3.

Fig. 8 is an elevation of the form of blade shown in Fig. 7, as viewed from the right side of Fig. 7.

Referring to the drawing in detail, wherein similar reference numerals refer to similar parts throughout the several views, the invention is described in detail as follows:

The lower unit 10 includes an attaching or supporting arm 11, a relatively thin and wide normally horizontal work-shelf 12, and a spacing element 13, all formed integrally of any appropriate metal or other appropriate material, and it also includes the pivot or pivot-screw 14 which is normally fixed to the pivot-bearing 15 by any appropriate means, for instance, a nut 16. This pivot 14 is provided for pivotally connecting the upper unit or operating lever 17 to the lower unit; and the latter also includes a shearing edge, viz., the edge of a relatively thin and wide horizontally disposed shearing blade 18, secured interchangeably in place by any appropriate means, for instance, such as seen in the application herein before referred to, said shearing edge being shown at 19 in Figs. 2, 3, 4 and 6.

The upper unit or operating lever 17 includes a long rear arm 21 and a short front arm or shearing arm 22, the latter being provided with a shearing-blade-seat 23 which is apertured centrally at 24 for receiving a fastening means for an angular shearing blade 25 or 25a (Figs. 7 and 8); or a journal for a peripherally beveled rotary shearing blade such as indicated at 25b (Fig. 5); such fastening means or journal here being shown in the form of a screw 26 interengaged with a threaded nut 27, so it is removable for interchanging the blades when needed or desirable. Of course the respective blades 25, 25a and 25b are each provided with a central opening 28 for receiving the fastening means or journal. As an aid to the fastening means, and as positioning elements for the angular blades, I provide lugs or shoulders 29, preferably in pairs that abut against opposite longitudinal edges of the respective interchangeable angular blades; all these abutments or shoulders being radially spaced from the central opening 24 a distance greater than the lesser radii of the peripherally beveled rotary blade 25b, so as not to interfere with rotation of the latter; but all these elements 29 being near enough to the central opening of the respective angular blades to abut against the lateral or longitudinal edges of the latter for assisting the elements 26 and 27 in holding the angular blades in their respective shearing positions with respect to the lower shearing edge 19. The blade-seat 23 is laterally offset a considerable distance from the element 13, and the offset-distance for the shearing edges 19 and 30 is still greater, owing to the thickness of the upper shearing blade. This lateral spacing from the element 13, and the fact that the element 13 holds the elements 11 and 12 spaced from one another, provides ample clearance between the vertical plane of the shearing edges and the rear parts of the shears, so the work-material can move or be moved into said clearance or clear space when the path of shearing is curved or angular. However, the clearance just referred to is applicable only to the part of the work-material that is on the work-shelf's upper surface, so a provision must be made for clearance at the underside of the work-shelf, in view of the necessary rigidity and strength and consequent thickness of the work-shelf's forward projection or jaw-element 31 that carries the lower shearing blade. This part 31 is laterally convexed and outwardly inclined at 32, and the lateral inclination 32 extends rearward a considerable distance beyond the forward projection 31, as shown at 31a, all that edge-portion between 31 and 31a being a stiffening rib formed so as to amply rigidify the entire work-shelf; and the inclined part 32 guides the under-part of the work-material laterally beyond the work-shelf when the relative movement of the work-material is such as to press the work-material against the inclined part 32, that is, when shearing along a leftwardly curved line, the inclined part 32 exerts a camming or wedging action that presses the under part of the material down to where it is free from interference.

For the sake of precision and ample rigidity, the bearing 15 and adjacent parts of the arm 11 are provided with a wide slot 33 in the upper side and between the lateral sides of the arm 11, in which slot is snugly fitted a boss or hub 34 of the upper unit 17, and this hub is apertured at 35 to fit snugly around the pivot 14; so, by this construction and arrangement, the operating lever 17 can be swung easily about its pivot while having not any appreciable lateral play, and the upper shearing edge is thereby held snugly against the lower shearing edge so as to cooperate in producing a shear that is smooth and free from ragged edges.

The ball 21a of the operating lever is for the purpose of operatively connecting such operating arm to any appropriate mechanical operating means, such, for instance, as an electric motor, steam engine or compressed air motor (none of which are here shown), but in Fig. 1 is shown a fragment 37 of a motor-casing or frame which serves as a support for the arm 11 which is provided with screws 36 as means for securing the arm 11 to its supporting means 37.

In operation, the work-material is passed into the narrow space between the front ends of the shearing edges while the lever 17 is moved rapidly upward and downward, by its operating means, substantially from its full-line position to its broken line position in Fig. 6, so that the work-receiving space between the shearing edges is never entirely closed, and the cutting edges are never entirely out of mutual contact, and so the ends of the shearing blades never mar the evenness of the shear-cuts by the contact of the blade-ends with the material being sheared. Assuming each shearing stroke to be about 1/64 to 1/32 inch and that the sheet material to be 38 gage (about 1/16 inch thick), the shearing begins at the curved arrow $b$, and the first shearing stroke cuts only the approximate distance from arrow $b$ to arrow $c$, but not through the sheet, then, after several more cutting strokes, the sheet's edge is cut through at the arrow $a$; thereafter, as the cutting strokes are rapidly repeated, the shearing is effected between the arrows $a$ and $c$ while the work-material is fed further and further rearward by relative movement of the tool and material. The guiding of the material or of the tool may be accomplished either by manipulation or by appropriate mechanical means.

The form of blade 25 is rectangular with the exception of two corner-portions where the sharp edge-portion 30$x$ is disposed at an obtuse angle to the intermediate part of the sharp edge of the shearing blade, so as to eliminate permanent distortion of the work-material, that is, such distortion that would result from being pressed too far below the lower shearing edge by a corner or acute point alined with said intermediate portion. In the form of blade shown in Figs. 7 and 8, the four corners of the sharp shearing edge are thus formed at obtuse angles, so these blades can be used interchangeably on the two forms of shears shown in Figs. 2 and 3. As a further modification of the blades 25$a$, they may be recessed at 25$y$ (Figs. 7 and 8) to provide clearance at the shearing point for unobstructed turning of the work-material toward the element 13.

The words "sharp" and "shearing", as herein applied to edges, are used to distinguish from edges in the broad or loose sense, and to mean the practically invisible line that is first to touch the work-material at the beginning of a shearing stroke.

Though I have described this form of my invention specifically, it is not my intention to limit my patent protection to these precise details of construction and arrangement, for the invention is susceptible of numerous changes within the scope of the inventive ideas as implied and claimed.

What I claim as my invention is:

1. In shears of the character described, a normally lower unit that includes a normally horizontal and vertically thin shearing blade, a pivot-bearing above and at rear of the shearing edge of said blade, an arm united with said pivot-bearing and extending rearward therefrom, and means for securing said arm to a support therefor, in combination with a lever that is provided with a pivot within said pivot-bearing and operatively connecting the lever to the pivot-bearing, said lever having an arm that extends rearward from said pivot-bearing and is adapted to be connected to an external mechanical device for effecting rapid upward and downward movements, and a second shearing blade, said lever having a front arm in front of said pivot-bearing, and means for securing said second shearing blade to said front arm in an approximately or substantially vertical position in which its shearing edge is in contact with the shearing edge of said horizontal shearing blade and operable to be moved downward by the upward strokes of the second said arm.

2. In shears of the character described, a normally lower unit that includes a supporting arm that is normally substantially horizontal and has a pivot-bearing at its front end, and means for securing said arm's rear end to an external support, said unit also including a normally horizontal work-shelf and an intermediate spacing element, the latter having its upper end united with said supporting arm and its lower end united with one edge-portion of said work-shelf, the opposite edge portion of the work-shelf being a considerable distance from said spacing element and having a front end that projects forwardly from the spacing element and is provided with a flat horizontal and vertically thin shearing blade which has a shearing edge in a plane substantially parallel to said supporting arm, in combination with a lever which includes a long rear arm and a short front arm and means for pivotally connecting this lever to said pivot-bearing in such relation that said long arm projects normally over said supporting arm, and means for operatively connecting said long arm to an external mechanical device for imparting short and rapid upward and downward strokes to said long arm, the short arm of said lever being provided with a shearing edge that is properly engaged with the first said shearing edge to effect the shearing of a sheet or strip that is fed into a space between the shearing edges while the said lever is moved upward and downward.

3. The combination defined by claim 1, said second shearing blade having a corner-portion of its sharp edge disposed substantially at an obtuse angle to the intermediate part of the sharp edge of this shearing blade, so as to eliminate permanent distortion of the work metal such as would result from pressing the metal too far below or beyond the lower shearing edge by an acute point alined with said intermediate portion.

4. The combination defined by claim 1, said pivot-bearing and supporting arm being provided with a slot in its upper side and between its lateral sides, which slot extends rearward from said pivot bearing into the intermediate part of said supporting arm, and said lever being snugly fitted in said slot and between said lateral sides in proper relation to have free upward and downward movements while securely held against lateral movement, substantially as shown and described.

5. In an element of a shearing tool or machine, an approximately rectangular shearing blade having the rear end of its shearing edge disposed substantially at an obtuse angle to the intermediate part of the sharp edge of this shearing blade, substantially as shown and described, for the purpose specified.

6. The combination defined by claim 2, said pivot-bearing and supporting arm being formed with a slot that is between the lateral sides of said arm and extends rearward in its upper side from the pivot bearing into and along the intermediate part of the supporting arm, and said lever having its fulcrum snugly fitted between said lateral sides and in the part of said slot that is in said pivot-bearing while the long arm of said lever has a portion in said slot and a portion that extends from said slot over the supporting arm and substantially parallel therewith, for purposes specified.

7. The combination defined by claim 2, said pivot bearing of the supporting arm being formed integrally of two spaced and apertured lateral portions between which is snugly fitted the fulcrum portion of said lever in such relation that said lever has free upward and downward movement and is held rigidly against lateral movement, for the purpose specified.

8. The combination defined by claim 1, the said lower unit being inclusive of a work-shelf that has an under-side portion partly under and partly in rear of the first said shearing blade and constitutes a rigidifying rib that has an inner edge inclined downward and outward from the remaining part of said under-side of the work-shelf said inclined inner edge being laterally convexed substantially throughout its length so as to effect a wedging action against the lower part of work-material being sheared along a curved or angular line, for the purpose specified.

9. In an element of a shearing tool or machine, an approximately rectangular shearing blade having a sharp shearing edge and having a front surface which includes a plane portion and a recessed lateral portion, said recessed lateral portion being a slight distance from said shearing edge, and said plane portion extending from said recessed lateral portion to said sharp shearing edge and being flush with the latter, substantially as shown, for the purpose specified.

10. In shears for shearing sheet metal and the like, the combination of a shearing blade provided with a shearing edge and with a supporting means therefor, a second shearing blade having a shearing edge that includes a main intermediate portion and an end-portion disposed at an obtuse angle to one another, the said obtuse angle of the second shearing edge being normally against and across the first said shearing edge in such relation that an angular space is between these shearing edges and that the apex of said obtuse angle is very near to the first said shearing edge, substantially as shown, for a purpose specified, and means to cause said shearing edges to slide against one another for narrowing the said angular space so as to shear sheet material that is fed into said space.

11. In shears for shearing sheet metal or the like, the combination of a blade having a shearing edge, a unit that includes a work-shelf and a shearing edge which latter is against and across the first said shearing edge, said work-shelf having an under-side portion that is partly under the second said shearing edge and partly in rear of the latter and constitutes a rigidifying rib which has a surface that is inclined outwardly from the second said shearing edge and from the remaining part of said under-side portion so as to effect a wedging or camming action against the lower part of work-material that is being sheared along an angular or curved line, thereby automatically providing clearance for the said lower part of the work-material with respect to said rigidifying rib.

FREDERICK TOOP.